(12) United States Patent
Zhao

(10) Patent No.: US 11,568,855 B2
(45) Date of Patent: Jan. 31, 2023

(54) SYSTEM AND METHOD FOR DEFINING DIALOG INTENTS AND BUILDING ZERO-SHOT INTENT RECOGNITION MODELS

(71) Applicant: Tiancheng Zhao, Pittsburgh, PA (US)

(72) Inventor: Tiancheng Zhao, Pittsburgh, PA (US)

(*) Notice: Subject to any disclaimer, the term of this patent is extended or adjusted under 35 U.S.C. 154(b) by 230 days.

(21) Appl. No.: 16/642,446

(22) PCT Filed: Aug. 29, 2018

(86) PCT No.: PCT/US2018/048603
§ 371 (c)(1),
(2) Date: Feb. 27, 2020

(87) PCT Pub. No.: WO2019/046463
PCT Pub. Date: Mar. 7, 2019

(65) Prior Publication Data
US 2020/0251091 A1  Aug. 6, 2020

Related U.S. Application Data
(60) Provisional application No. 62/551,324, filed on Aug. 29, 2017.

(51) Int. Cl.
| G10L 15/06 | (2013.01) |
| G06N 20/00 | (2019.01) |
| G06N 5/04 | (2006.01) |
| G10L 15/26 | (2006.01) |

(52) U.S. Cl.
CPC ............ *G10L 15/063* (2013.01); *G06N 5/04* (2013.01); *G06N 20/00* (2019.01); *G10L 15/26* (2013.01)

(58) Field of Classification Search
None
See application file for complete search history.

(56) References Cited

U.S. PATENT DOCUMENTS
| 2012/0269436 A1 | 10/2012 | Mensink et al. |
| 2014/0380285 A1* | 12/2014 | Gabel ............... G06N 5/022 717/139 |
| 2016/0210532 A1* | 7/2016 | Soldevila ............ G06V 20/00 |
| 2019/0065492 A1* | 2/2019 | Cheng ................ G06F 16/435 |

OTHER PUBLICATIONS
International Search Report and Written Opinion of the International Searching Authority for PCT Application PCT/US2018/048603 dated Dec. 20, 2018.

* cited by examiner

Primary Examiner — Nafiz E Hoque
(74) Attorney, Agent, or Firm — David G. Oberdick

(57) ABSTRACT

A system and method of creating the natural language understanding component of a speech/text dialog system. The method involves a first step of defining user intent in the form of an intent flow graph. Next, (context, intent) pairs are created from each of the plurality of intent flow graphs and stored in a training database. A paraphrase task is then generated from each (context, intent) pair and also stored in the training database. A zero-shot intent recognition model is trained using the plurality of (context, intent) pairs in the training database to recognize user intents from the plurality of paraphrase tasks in the training database. Once trained, the zero-shot intent recognition model is applied to user queries to generate semantic outputs.

21 Claims, 15 Drawing Sheets

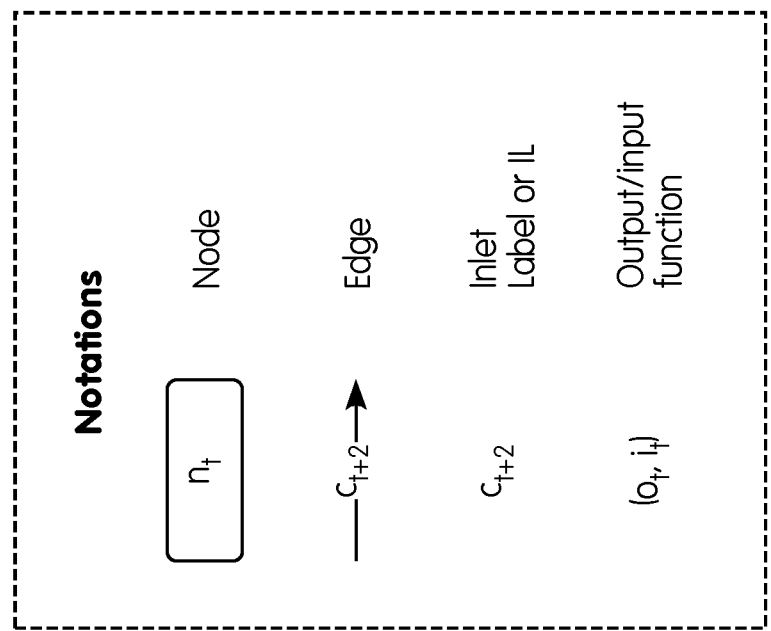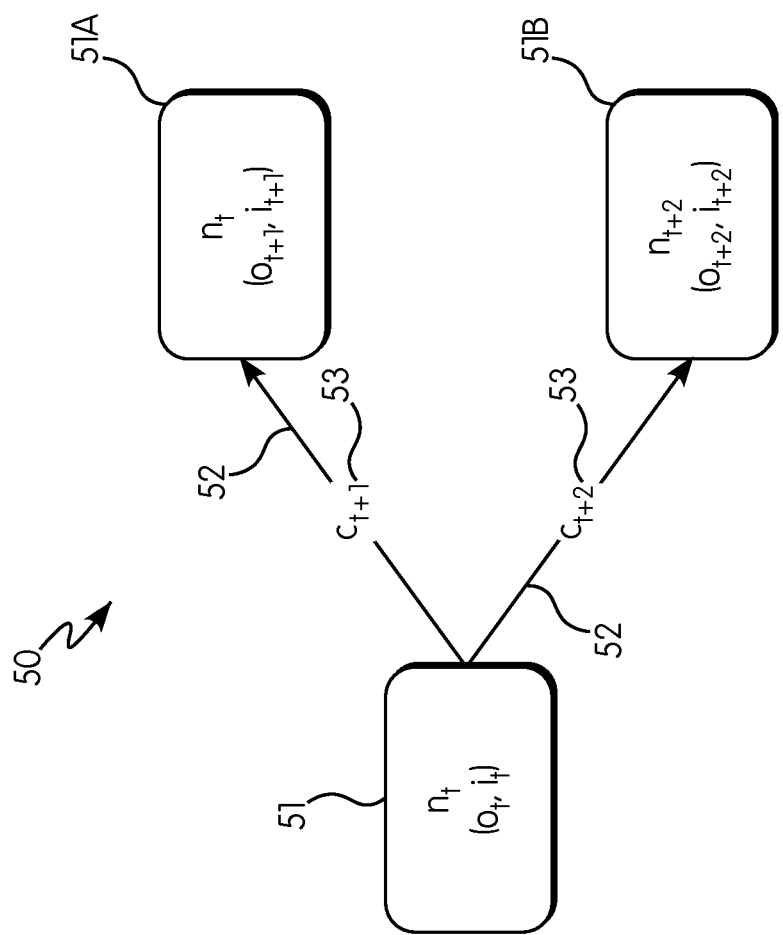
FIG. 4

Dialog Context: "Hi, welcome. How can I help you?"

Intent: ask for where you can find the TV section

Sample answers:
1. Where can I buy TV?
2. Can you tell me where to buy electronics?
3. I am looking for LG TV.

Instructions:
Please write a new response that expresses the same meaning of the given intent. Please try to write a response that is different from the given samples in terms of word choice or sentence structure as much as possible.

| Enter your input here |

| Submit | | Give up |

FIG. 10

SYSTEM AND METHOD FOR DEFINING DIALOG INTENTS AND BUILDING ZERO-SHOT INTENT RECOGNITION MODELS

CROSS-REFERENCE TO RELATED APPLICATIONS

This application is a PCT International Application claiming priority to U.S. Provisional Application Ser. No. 62/551,324 filed on Aug. 29, 2017 and incorporated by reference herein in its entirety.

FIELD OF THE INVENTION

The invention relates to a system and method for creating the natural language understanding component of a speech/text dialog system, and more particularly, to a speech/text dialog system having a robust intent recognition.

BACKGROUND

Dialog systems are designed to converse with a human in a coherent discourse structure. The input and output of dialog systems can include text, speech, graphics, gestures and other communication channels. In the last decade, dialog systems have become an increasingly important part of people's lives: Siri from Apple, and Cortana from Microsoft, among others, are all recent successful applications of dialog systems.

Despite the success of commercial dialog systems, developing a high-performance dialog system is still a challenging and complex task. Two groups of people often are involved in the development: domain experts, who have knowledge in the domain in which the system is intended to operate (including, without limitation, health, e-commerce) and dialog experts, who have knowledge in computer science and implementing dialog systems. Also, current mainstream dialog systems generally consist of the following major components: natural language understanding (NLU), dialog management (DM) and natural language generation (NLG). This present invention serves to improve the construction process and the performance of the NLU component.

There are two steps in implementing these components. The first step is dialog task definition, whereby the domain experts and dialog experts need to engage in lengthy interactions and discussions to properly define the expected behavior of the targeted dialog system. Flowcharts, example dialogs and verbal descriptions are common tools for the experts to communicate with each other.

One essential step of creating the NLU is the creation of a list of intent labels that need to be recognized. Intent represents the meaning of an utterance at the level of illocutionary force, is an essential piece of information to be recognized for any dialog systems, and is often denoted as intent recognition. The list of intent labels represents a set of user intentions that should be recognized and properly handled by the dialog system. For example, an intent label of "set_alarm" corresponds to an user intent to set an alarm.

The list of intent labels are always changing throughout the lifecycle of a dialog systems from the development stage the deployment stage, because (1) the required system behavior is subject to change, and (2) previous defined intents may be subject to removal, modification or splitting into fine-grained intents to improve the system's performance. In theory, there are unlimited possible types of intent that a human user can express, and a finite list therefore also needs to be expanded.

In the second step, the dialog experts, based on the intent definition, implement the intent recognition model in the NLU and collect a large dataset of annotated data (utterance, intent_label) pairs. This process may take months and any miscommunication between domain and dialog experts can cause extra delay and unsatisfactory system performance. Furthermore, since intent definition is always subject to change as discussed above, the dialog experts often need to re-annotate the data and retrain the model, which is expensive and tedious.

In this context, there has been much research and many different approaches used in creating an intent recognition engine for the NLU, including the use of machine-learning sentence classification and phrase-based regular expression matching. In general, the current approach to describing an intent definition task generally involves the steps of (1) tasking domain experts to come up with a list of intent labels based on either linguistic knowledge or existing dialog data, (2) engaging annotators to annotate large dialog datasets by assigning an intent label to each utterances, and (3) developing an intent recognition model is trained by treating each intent label as a "one-hot" label, i.e., labels that are independent of each other. Examples of companies and/or products using the current approaches to intent definition include Dialogflow (www.dialogflow.com), Chatflow (www.kitt.ai), Wit.ai (www.wit.ai) and LUIS (www.luis.ai).

The current approaches have certain limitations, however, including the fact that it is challenging for domain experts to create intent labels and collect corresponding labelled data from pure dialog data. In addition, because the intent labels are frequently updated and changing, the annotations on the dialog data and trained model are frequently invalidated, with a resulting incurrence of a high cost in both resources and time to address and correct the invalidated annotations.

The present invention addresses and overcomes these limitations by providing a new system and method for domain experts to (1) easily create intent specification and a training dataset, and (2) create intent recognition models that are robust to frequent updates and output rich semantic information.

BRIEF SUMMARY OF THE INVENTION

In particular, the system and method of the present invention uses a novel task definition format called intent flow (previously referred to as "goal flow") that has several key attributes. First, intent flow contains sufficient information to develop an intent recognition model in the NLU. Finally, intent flow is not restricted to a particular type of interface. Any interface, including, without limitation, a GUI, can be used to create dialog flow as long as the interface can validate that a domain expert's creation is in the valid dialog flow form. FIG. 7 is an example of a web interface that can be used to create intent flow.

The intent flow system and method of the present invention enables domain experts to unambiguously describe the expected task logic for the system. Therefore, the intent flow of the present invention can be helpful to improve the efficiency of communication between a domain expert team and a dialog expert team.

Intent flow is related to prior art concepts using flowcharts and task tree, to specify the task of dialog systems. However, past flowcharts or task trees are used to define the decision-making logics of entire dialog systems, whereas the intent flow concept in the present invention is used solely to help the domain experts to brainstorm and create the potential user intentions in the dialogs from a particular domain.

In addition, other prior art used to create intent lists focuses on analyzing existing dialog datasets. This prior art method requires linguistic experts to manually or semi-automatically analyze utterances from a dialog dataset and summarize them to a list of abstract intentions. Compared to this approach, intent flow has two advantages: (1) intent flow does not require a pre-existing dialog dataset; and (2) intent flow requires much shorter time and less human power to create intents definitions.

The present invention also addresses and overcomes the limitation of known dialog systems through the use of a novel paraphrase task generator, and a novel Zero-Shot Intent Recognition or ZSIR Model. In particular, in one embodiment of the present invention, for a given intent flow with a "dialog_context" and "user_intent" or (context, intent) pair, a set of paraphrase tasks are generated and dispatched to crowd annotators or workers who paraphrase these paraphrase tasks into different utterances with the same intentions to create a training dataset. The paraphrase task generator provides a method to efficiently collect labelled natural language data for intent recognition, whereby there is no need for annotation since the ground-truth intent labels are known and dialog context is taken into account.

The created training dataset then is used to train a zero-shot intent recognition (ZSIR) model. The ZSIR model is used to recognize intents from user inputs, i.e., (1) a user utterance, (2) dialog context for the utterance, that is, the previous utterance in, and context for, an actual dialog, and (3) a list of candidate intent labels (in natural language form). Based on these inputs, the model generates semantic output results, including the matching score between the user utterance to all of the candidate intents, and out-of-domain signals, including, without limitation, the user query not matching with any of the candidates or that the user query is too different from what is being observed in the training data. In other embodiments of the present invention, intent definitions also can come from other existing methods (other than intent flow) as long those methods define intents as "dialog_context" and "user_intent" pairs. Thus, the paraphrase generator of the present invention is not solely coupled with intent flow, and the ZSIR model can be training using (context, intent) pairs generated by methods other than intent flow. Again, however, intent flow is preferable over other such methods because intent flow does not require a pre-existing dialog dataset, and intent flow requires much shorter time and less human power to create intents definitions. Through use of the ZSIR model, intent flow helps domain experts to brainstorm about the expected user intents in a dialog domain.

BRIEF DESCRIPTION OF THE DRAWINGS

FIG. 4 is an intent flow graph according to one embodiment of present invention.

FIG. 10 is an example interface for workers in the paraphrase task generator of the present invention.

DETAILED DESCRIPTION OF THE INVENTION

Figure 1:
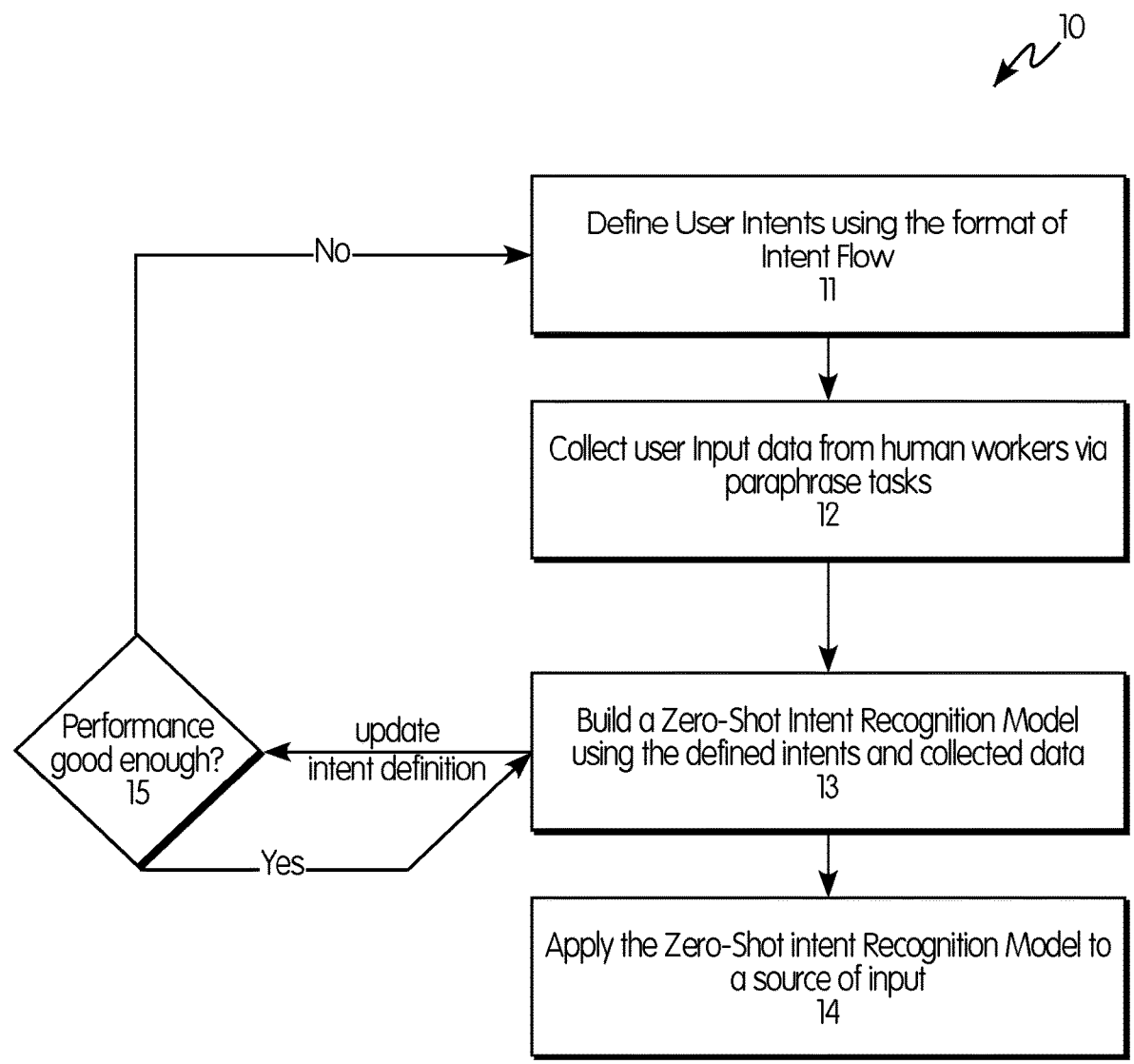
FIG. 1 is a flowchart showing one embodiment of the method of the present invention.
Figure 2:
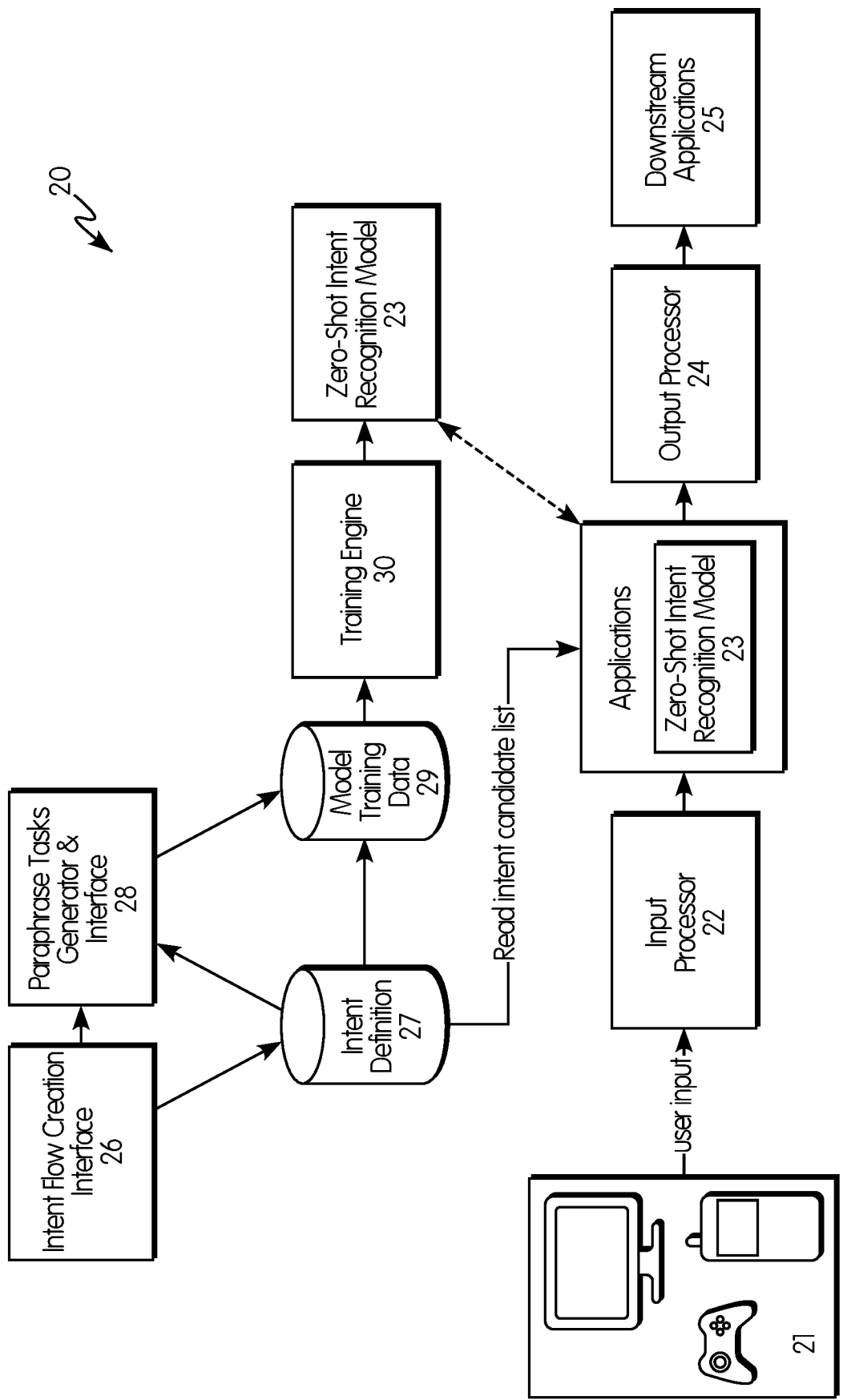
FIG. 2 is a block diagram showing one embodiment of the present invention.
Figure 3:
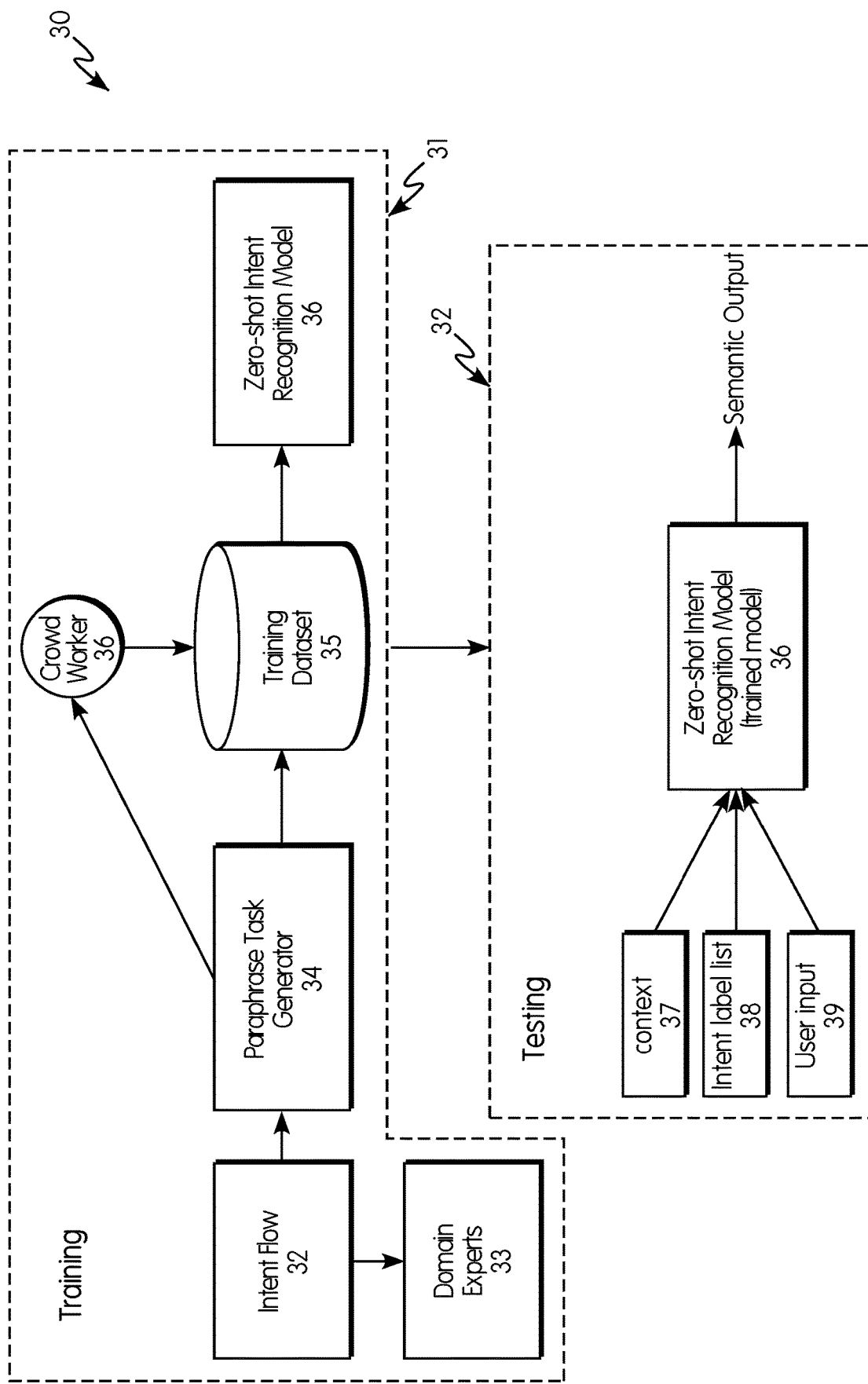
FIG. 3 shows the overall process steps of one embodiment of the present invention, including training and testing/application stages.

The method of the present invention is generally shown in FIG. 1 as flowchart 10, and the system of the present is generally shown in FIG. 2 as block diagram 20. The overall process steps or pipeline 30 of the present invention is shown in FIG. 3 and involves two stages: (1) training 31, and (2) testing/application 32.

Referring to FIG. 1, a flowchart 10 showing one embodiment of the method of the present invention is shown. The method includes a first step 11 of defining user intents using the format of intent flow. The next step 12 involves the collection of user input data from human workers via paraphrase tasks. The building of Zero-Shot Intent Recognition ("ZSIR") model using the defined intents and collected data occurs next at step 13. After the ZSIR model is built, the ZSIR model, it is applied to a source of input at step 14. Prior to the completion of the ZSIR model, though, updated intent definitions are measured for satisfactory performance at step 15. If performance standards are adequate, the ZSIR model is finalized for use at step 15. If not, the process steps start again at step 11.

Referring to FIG. 2, a block diagram 20 of the present invention is shown. As shown in diagram 20, various multimedia or data inputs 21 are input to processor 22. The processed inputs are then subjected to application of the ZSIR model 23, with resulting output to output processor 24 and, next, use in downstream applications 25. The ZSIR model is built by the creation of intent flow at intent flow creation interface 26. Intent flow passes next to intent definition module 27. Intent definition passes from module 27 to both paraphrase tasks generator and interface 28 and model training data module 29. Model training data module 29 also receives input from paraphrase tasks generator and interface 28. The output from model training data module passes next to training engine 30 in order to build ZSIR model 23.

Figure 7:
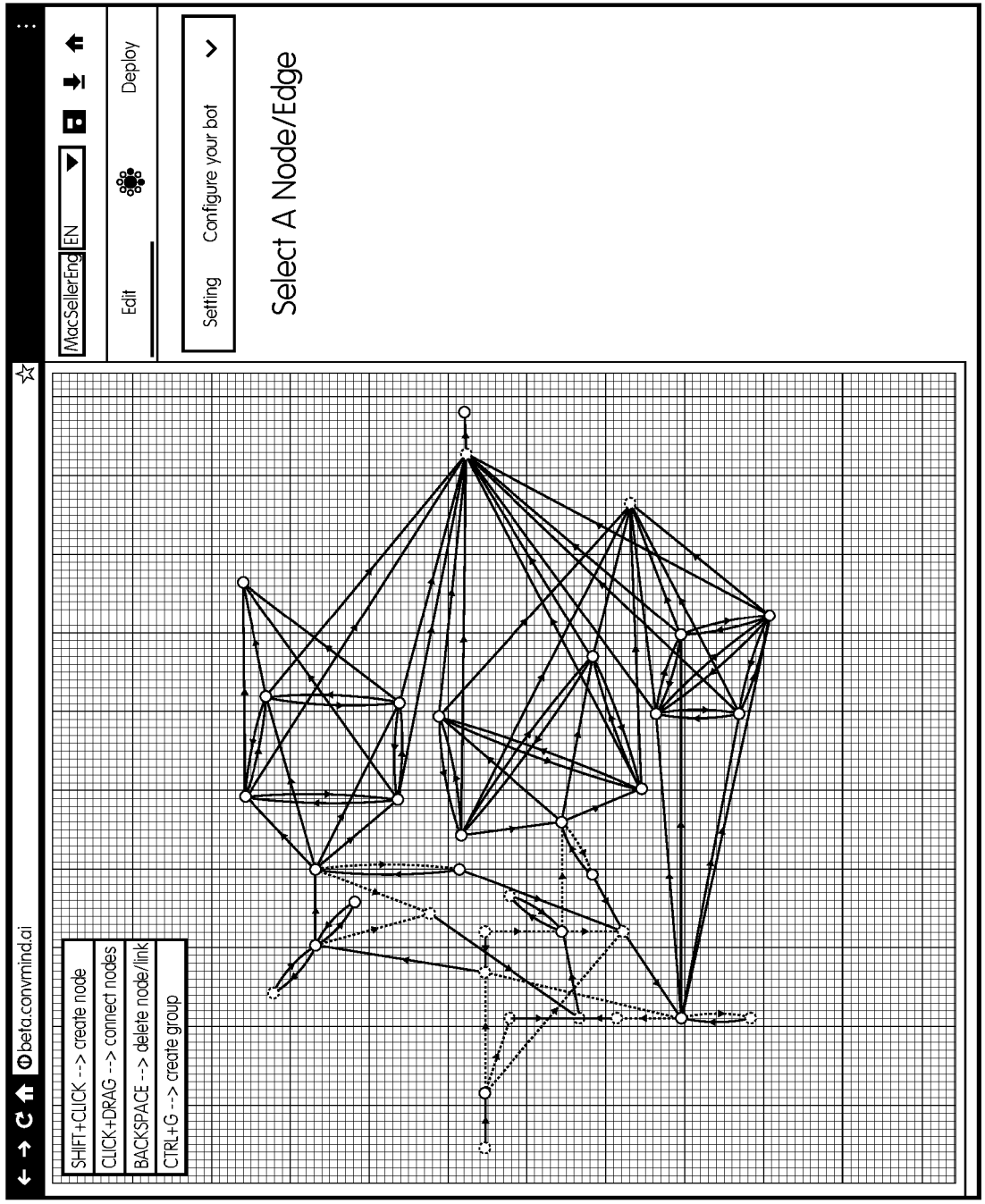
FIG. 7 is an example of a web interface used to create intent flow.

As shown in FIG. 3, the training stage 31 involves the three primary steps. At the first step, domain experts 33 use any intent flow interface to draw an intent flow 32. FIG. 7 provides an example of a web interface used to create intent flow.

Next, with a given intent flow 32, a set of paraphrase tasks 34 are generated and dispatched to crowd annotators or workers 36 who paraphrase these paraphrase tasks into different utterances with the same intentions to create a training dataset 35. The created training dataset then is used to train a zero-shot intent recognition (ZSIR) model 36.

Referring again to FIG. 3, the testing/application stage 32 uses the ZSIR model 36 to recognize intents from user inputs 37, 38 and 39. More specifically, the resulting ZSIR model 36 takes three inputs: (1) the dialog context 37, i.e., the previous utterance and context for the user input utterance, (2) a list of candidate intent labels 38 (in natural language form), and (3) a user input utterance 39. Dialog context 37 and user input 39 both are derived from actual dialog and are new and specific to that dialog. The list of intent labels also can be new, so long as they are expressed in natural language sentences, or the intent labels can be obtained and derived from prior implementation of the training stage of the present invention and, in particular, previously developed intent flow graphs. Based on these inputs, the model output has rich semantic parsing results as output 40. These output results 40 include the matching score between the user input utterance to all of the candidate intent labels. The output results 40 also include out-of-domain signals, including, without limitation, the user query not match with any of the candidate intent labels or the user query is too different from what is being observed in the training data. Importantly, because the intent labels are now expressed as natural language, this model does not need re-training to handle brand new intent labels.

Intent Flow

Intent flow is a special type of directed graph that describe the flow of tasks for a dialog process. Referring to FIG. 4, intent flow graph 50 is composed of 2 types of elements: nodes 51 and 51A, and edges 52. A dialog process is expected to follow the direction of edges 52 on the graph 50 and move from one node 51 to anther until reaching a node 51A with no out-pointing edges.

In FIG. 4, node 51 (i.e., $n_t$, where t is the node ID) represents a "goal" of the task. A goal is a state that the designers want the dialog process to achieve in certain situations. For example, a node 51 can be associated the goal "acquire user's phone number".

Figure 5:
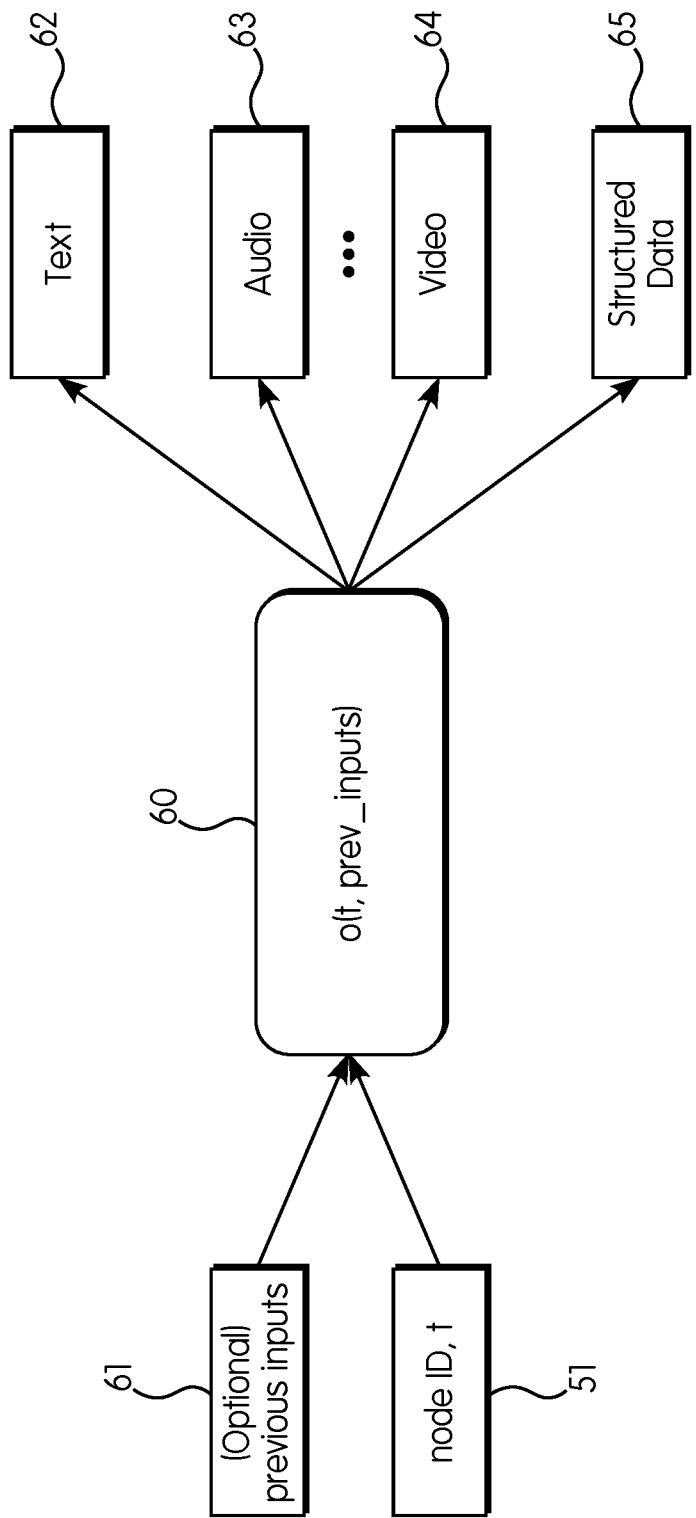
FIG. 5 is a flowchart showing the inputs to and outputs from nodes in intent flow of the present invention.

As shown in FIG. 5, when a dialog-system moves its focus to a node 51, each node will generate an output 60 that is expected to send to users. Therefore, a node 51 is associated with an output function (i.e., $o_t$ is the output function of node $n_t$). The content of $o_t$, i.e., o(t, previous inputs), is a function of its node ID, as well as optional parameters 61 (previous input values in the path from the initial node to the current node) as shown in FIG. 5. The type of output is not limited to text, but also inclusive to diverse multi-media formats, including, without limitation, text 62, audio 63, video 64, and structured data 65. Also, intent flow imposes no limitation of the type of function underlying the nodes 51, so that they are fully customizable by the developer.

Besides the output function, a 51 node also contains an input function (i.e., $i_t$ is the input function for node $n_t$ in FIG. 4). The input function represents an expectation of user input at this step. There is no limitation on the types of input channels, so that the inputs can be text from typing, transcriptions from automatic speech recognition (ASR), audio clips, button-clicks, images, and other multi-media data.

As discussed above and shown in FIG. 4, another key element of an intent flow graph 50 is edge 52, which is associated with the intent label 53 (previously referred to as a match condition) of user input. Each edge 52 represents one type of intent label 53. An essential property of intent label 53 in the present invention is that intent flow is expressed as a natural language sentence instead of linguistic symbol. For example, one intent label 53 can be: "education level>B.S". To handle more complex intents, intent flow optionally allows an edge 52 associated with a recursively constructed intent label 53 using logic operators. For example, a compound intent label 53 can be "education level>B.S" & "my major is Arts".

An edge 52 in intent flow is a directed arrow and connects from one node 51 to another. The starting node 51 is denoted as the source node. Similarly, the destination node 51A or 51B is denoted as target node. Children nodes 51A and 51B are used to refer to all target nodes of the outgoing edges 52 of a given source node 51. An edge 52 is indexed by $e_{s-d}$ where s is the ID of the source node 51 and d is the ID of the target node 51A. In FIG. 4, edge $e_{t-t+1}$ connects from $n_t$ to $n_{t+1}$ and edge $e_{t+2}$ connects from $n_t$ to $n_{t+2}$.

If one node 51 has more than one edge 52 pointing out from node 51, all of these edges 51 must be associated with an intent label (or "IL") 53, shown as $c_t$ in FIG. 4, where t is the ID of the corresponding edge 52. The basic element of an IL 53 is a primitive condition, which is a natural description about the kind of attributes that is expected in this edge. It can be evaluated against the input value in the preceding node 51 and outputs a real-number value between 0 to 1, which represents the degree of matching between the input and the condition. For example, assume an intent flow where the source node's output is "what's your education degree?" and the IL 53 on its proceeding edge contains just one primitive condition: "engineering bachelor degree". In this intent flow, if the user's previous input is "my major is computer science", then the evaluation result should be close to 1. If the user's previous input is "my major is music", then the evaluation result should be close to 0.

Furthermore, an IL 53 can be recursively constructed from multiple primitive conditions for an edge 52, and previous IL 53 on other edges 52. The construction follows a context free grammar (CFG). The vocabulary of the grammar contains a set of primitive tokens for an edge $e_{s-d}$, $p \in P_{s-d}$, a set of ILs 53, $m \in M_{s-d}$, that exist on other edges 52 that are reachable from the initial node 51 to the current source node $n_s$, and a set of logic operators: NOT, AND, OR and ( ). In this context, the IL 53 for $e_{s-d}$ obeys the following CFG:

IL=m|p
IL=NOT IL
IL=IL AND IL
IL=IL OR IL
IL=(IL)

For example, a compound IL 53 for edge $e_{3-4}$ can be: "engineering bachelor degree" AND "public school" OR $IL_{1-2}$, where "engineering bachelor degree" and "public school" are primitive conditions and $IL_{1-2}$ is the IL on edge $e_{1-2}$.

The above CFG (rules and vocabulary) is only an example of CFGs that an IL 53 can obey. Any CFG, as long as it is logically equivalent to the above CFG [9], can be used to construct an IL 53.

In summary, a valid intent flow graph should fulfill the following conditions. First, a node 51 represents a goal and has an output function and an input function. Second, the input function represents a user's input relative to the associated node. Third, the input function can have diverse multimedia and data types, including and not limited to text, audio, video and other structured data. Fourth, the output function of a node 51 depends on the node ID and optional previous inputs. Fifth, a node's output can have diverse multimedia and data types, including and not limited to text, audio, video and other structured data. Sixth, an edge 52 is directed arrow from one node 51 to another. Seventh, an edge 52 is associated with an intent flow or IL 53, where an IL 53 is a logic expression of one or more IL 53 and an optional IL 53 in the previous path, and the valid logic expression includes: AND, OR and NOT. Last, every IL 53 can be evaluated against a user input and will output a real-number value between 0 and 1 indicating the degree of matching.

Figure 6:
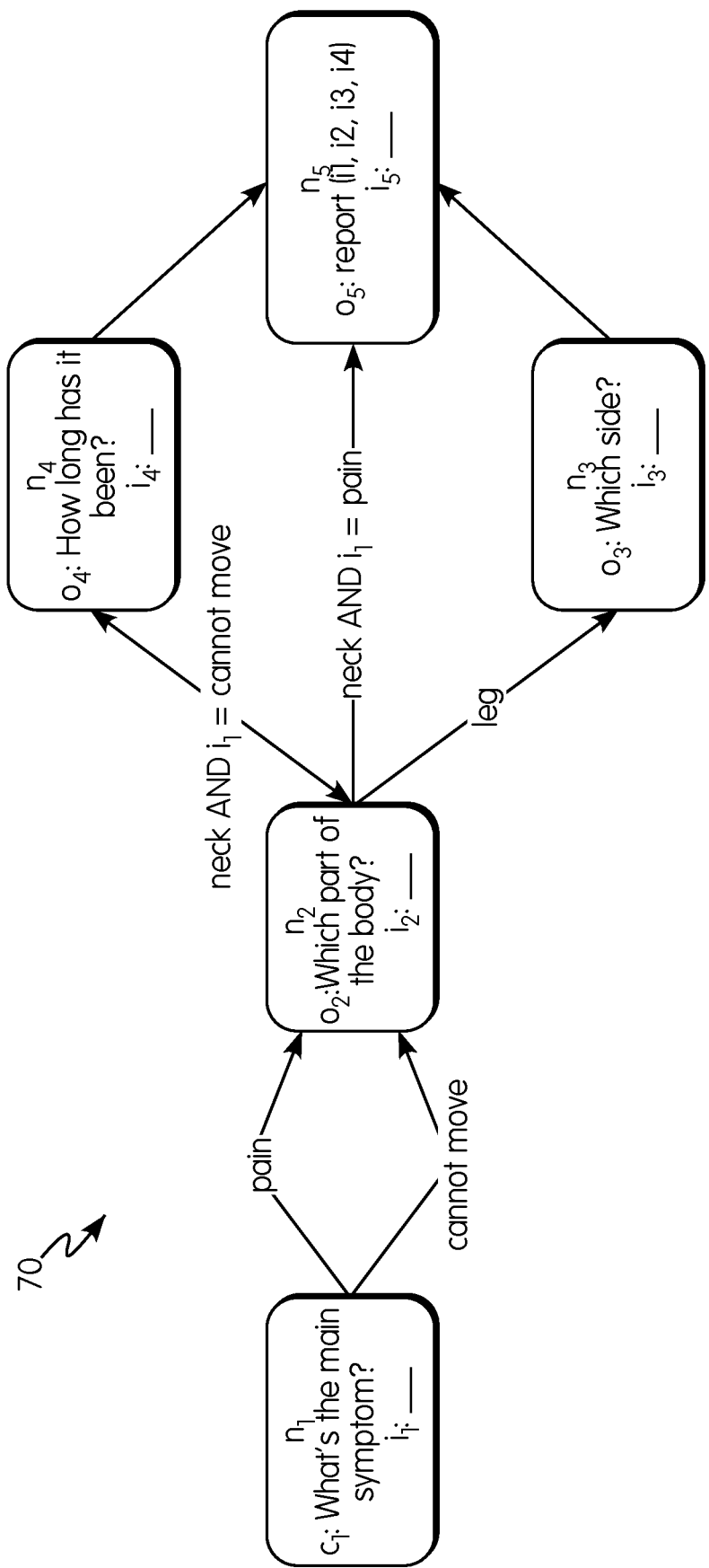
FIG. 6 is a flowchart showing an example of intent flow according to one embodiment of the present invention.

FIG. 6 shows an example intent flow for a medical dialog system 70, which exhibits several key properties of intent flow as defined above. Given this intent flow, the dialog system is configured to acquire information about various patients' symptoms and ask corresponding follow-up questions and finally generate a diagnosis report for each patient.

Most of any node's output function only depends on its ID, so that a node always outputs the same utterance independent of user input, including, without limitation, which part of the body? The rightmost node $n_5$ is a special one, because its output function depends on input $i_{1,2,3,4}$ to generate a report. FIG. 6 also shows that IL on each edge can either be a simple description that depends only on the preceding input (including, without limitation, "pain" or "cannot move" or "leg"), or compound logic, such as "neck AND $i_1$=pain".

Paraphrase Task Generator

Figure 8:
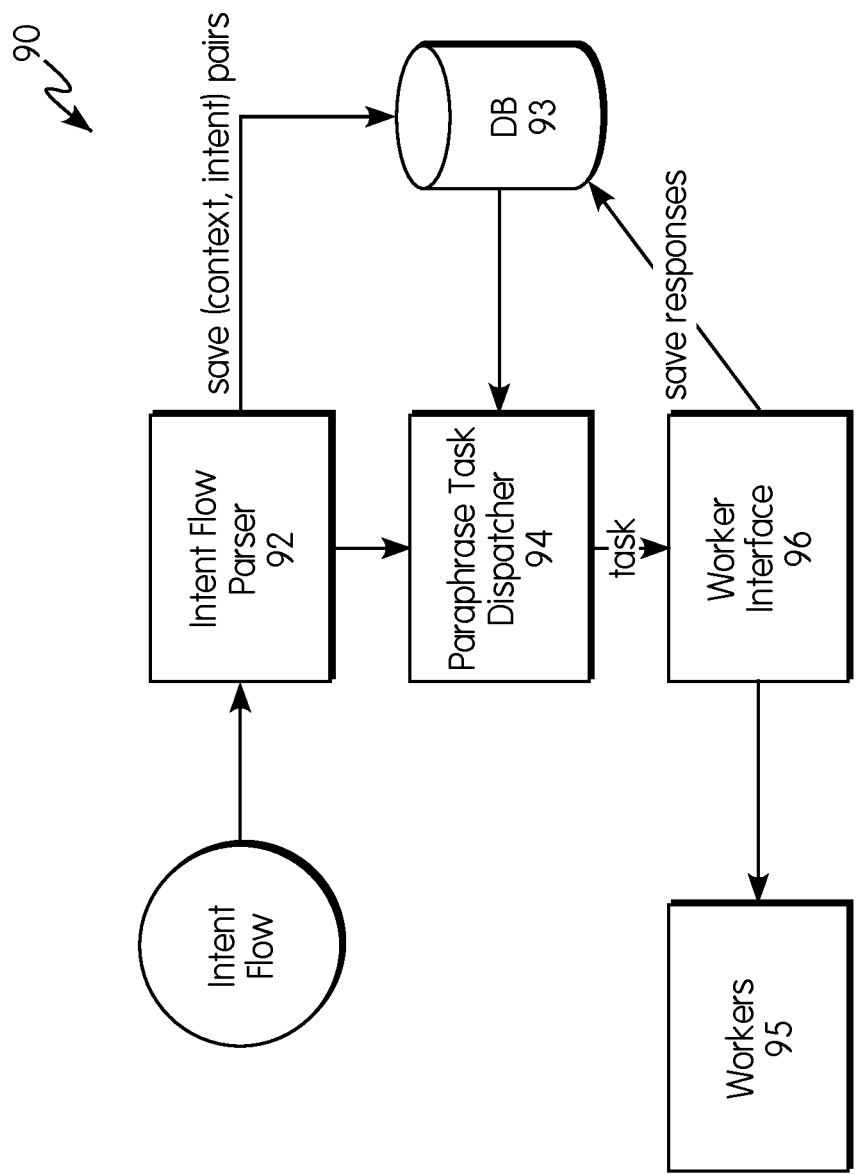
FIG. 8 is a block diagram showing paraphrase task generator module architecture according to one embodiment of the present invention.
Figure 9:
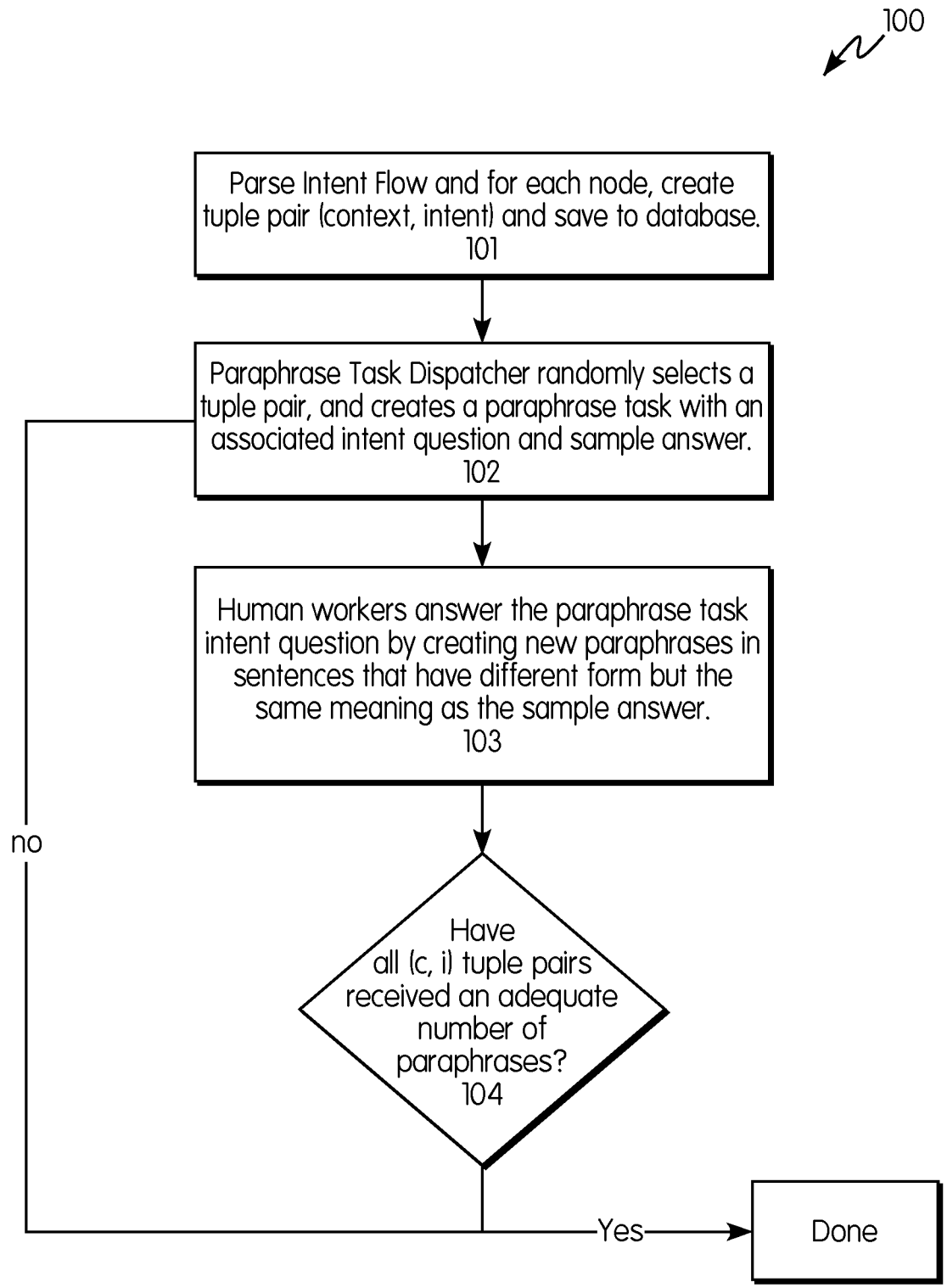
FIG. 9 is a flow chart showing the paraphrase task generator process of one embodiment of the present invention.

As shown in FIGS. 8-10, after development of a particular intent flow in the training stage of the present invention, a novel paraphrase task generator is used to parse the intent flow and create paraphrase task.

A task typically looks like as following:

Context: You are in a shop, a sale asks how can she/he help you?

Intent Label: you want to express: "I am looking for dress shoes"

Task: please write N utterances that are semantically similar but syntactically different, that expressed the above intent.

Optionally, other annotators answers will be shown to the current work and the task prompt will encourage this worker to write utterances that are different from the existing ones.

The result dataset will create data in the following tuple formats:

(context, intent, paraphrase_1, worker_id)
(context, intent, paraphrase_2, worker_id) . . .

The overall paraphrase task generator process is show in FIGS. 8-10. In this respect, an automatic paraphrase task generator is not used. Instead a custom paraphrase task generator is used with the present invention. FIG. 8 shows a block diagram 90 for the paraphrase module architecture. In particular, intent flow 91 is input to intent flow parser 92, which converts the intent flow into tuple pairs based upon dialog context and intent, otherwise referred to as a (context, intent) pair, and saves the pairs into a database 93. Next, a paraphrase task dispatcher 94 will sample the pairs from database 93 and create an associated paraphrase task with an intent question and at least one corresponding sample answer. A task includes a dialog context (that is, the subject of a dialog or conversation), a desired intent of the dialog and a plurality of sample answers as shown in FIG. 10. The first two variables can be directly obtained from the (context, intent) pair in database 93. The sample answers can be obtained from the paraphrases generated by human workers. The sampling can be done according to certain existing algorithms (any algorithm that eventually outputs a (context, intent) pair with certain probability is valid). For example, a naïve or simple sampling algorithm can randomly choose a (context, intent) pair from the entire database. Another more advanced sampling algorithm can choose the (context, intent) pair inversely proportional to the number of paraphrases that have already been collected. As a next step, a large group of human workers 95 (preferably more than 50 people in one embodiment, and including employees or crowd workers from crowdsourcing platform, including, without limitation, Amazon Mechanical Turk) will create new answers to the intent question in natural language, and, working through worker interface 96, the workers' answers will be saved back to the database 93.

FIG. 9 shows a flowchart 100 of the task generator process. The first step 101 in this flowchart involves the parsing of intent flow for each node, creating a tuple (context, intent) pairs, and saving tuple pairs into database 93. In the second step 102, a paraphrase task dispatcher, such as a server program, selects a tuple, via the sampling algorithm described above in connection with paraphrase task dispatcher 94, and creates a paraphrase task with at least one associated sample answer for each tuple pair, except in the very beginning of the data collection process, where there are no sample answers available. At the third step 103, a human worker creates new paraphrases by answering the question for the intent inquiry of each paraphrase task by forming a natural language sentence that has a different form but the same meaning as the at least one sample answer. In the fourth step 104, a check is run as to whether all tuple pairs have received an adequate number of paraphrases from workers. In general, better performance will be obtained from a higher number of paraphrases, and an adequate number of paraphrases can be measured against a predetermined threshold numbers. Another stopping criterion for determining an adequate number of paraphrases occurs when the workers cannot create any with more novel paraphrases for all of the tuple (context, intent) pairs which can be detected, at which point the workers can signal that the new tasks are needed (for example, the workers could click a "Give Up" option as discussed in connection with interface 110 in FIG. 10). If an adequate number of new paraphrases have not been reached, the process begins again at step 102. If yes, the paraphrase task generator process is complete.

FIG. 10 shows an example interface 110 for workers. These workers can include data annotators, employees, or crowd workers from crowdsourcing platforms, including, without limitation, Amazon Mechanical Turk. As shown in interface 110, the dialog context and corresponding question presented to the worker is "Hi, welcome. How can I help you? The intent in the tuple pair is "ask for where you can find the TV section." Examples are given, and the worker is asked to write a new response that expresses the same meaning of the given intent, but that is different from the examples given. Interface 110 provides a space for responses and then includes prompts for either "Submit" or "Give Up".

The novel features in the paraphrase task generator process include: (1) the use of intent flow to create (context, intent) pairs for creating paraphrase tasks; (2) the intent is expressed as a free-form natural language form (a property of intent flow); and (3) the sample responses in FIG. 3 are sampled from the existing answers from other workers. In this latter respect, the instruction explicitly asks the current worker to give a different response or they can choose to give up. This mechanism has proven to be very effective to solicit diverse responses from the workers and increase data collection efficiency. By measuring the give up rate, it also give useful information for the Task Dispatcher to select the next task, i.e., optimizing for the goal to maximize the data collection speed given constrained time & resources.

ZSIR Model

Figure 11:
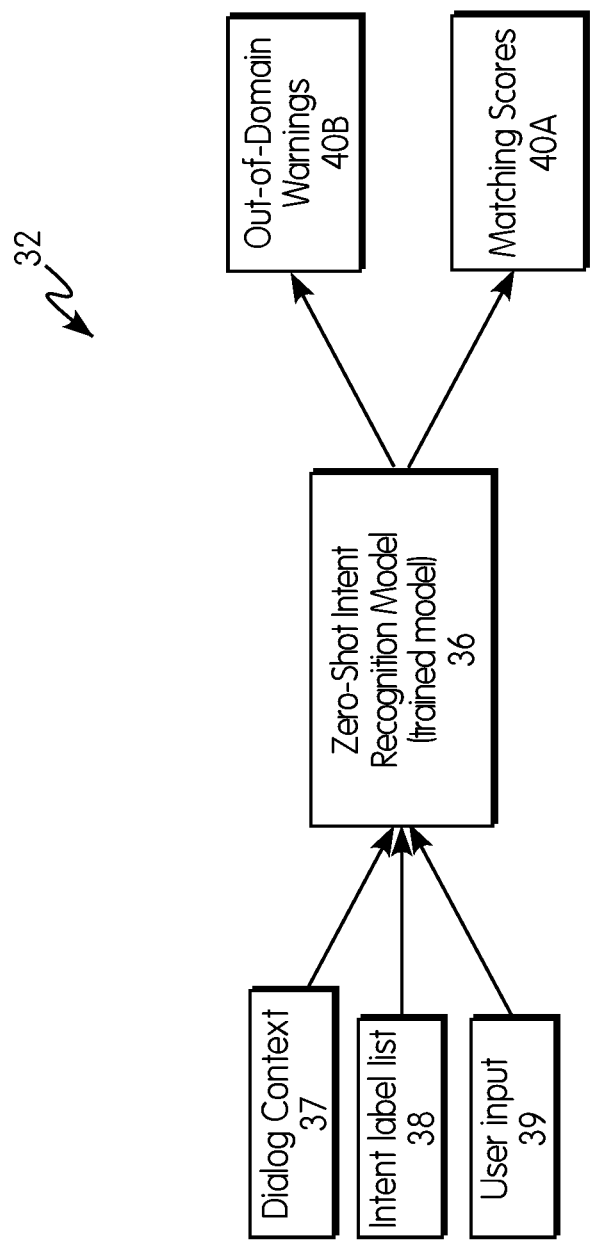
FIG. 11 is a flowchart showing the zero-shot intent recognition ("ZSIR") process according to one embodiment of the present invention.
Figure 12:
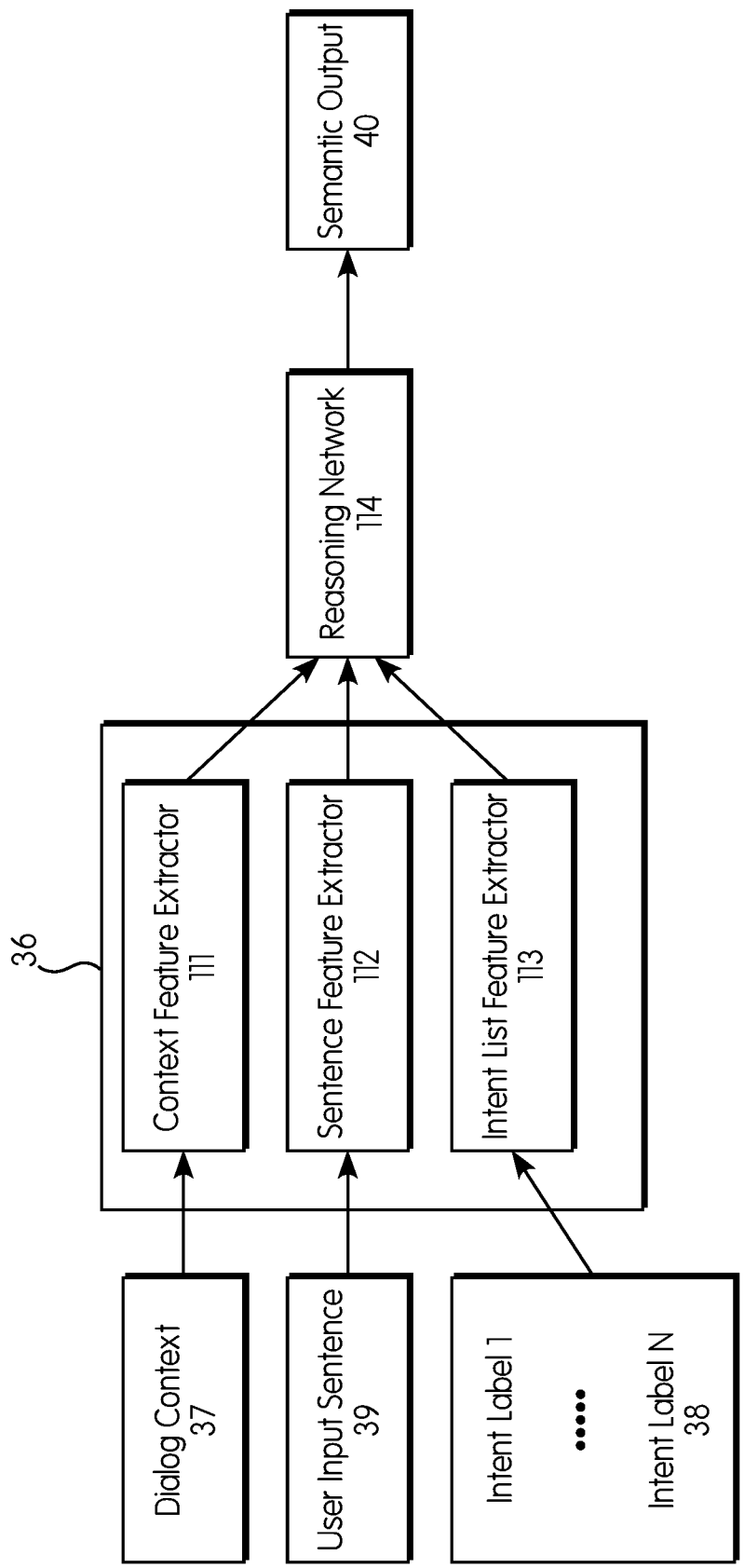
FIG. 12 is an internal flowchart of the ZSIR model according to one embodiment of the present invention.
Figure 13:
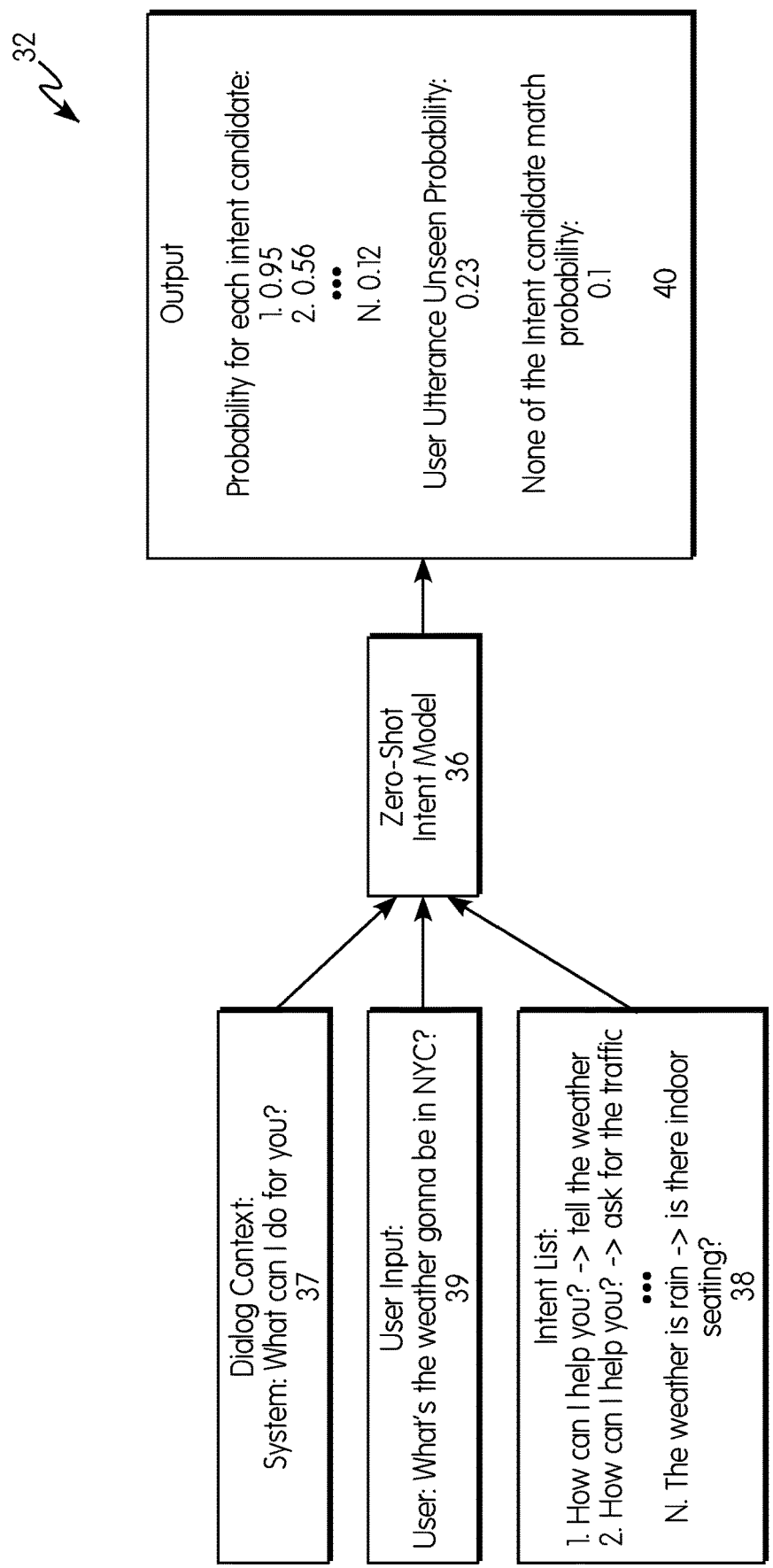
FIG. 13 is a more detailed flowchart of the ZSIR process shown in FIG. 11.

Referring to FIGS. 11-15, the ZSIR model is trained using known machine learning tools, including, without limitation, deep learning toolkits such as TensorFlow or PyTorch, as applied to the collected data, that is the (context, intent, paraphrase) tuple described above. The machine learning tool is used to construct neural networks following the high-level process shown in FIG. 12, and using optimization methods to learn the parameters that minimize loss functions. In connection with the system and method of the present invention, loss functions include: (1) a loss function for matching score, and (2) a loss function for an out-of-domain warning as shown in FIG. 13 and described more fully below.

The ZSIR model is novel in two respects. First, all of the intent labels are parametized using neural networks to map the intent labels (in natural language form) into semantic embeddings, so that the ZSIR model can be used to recognize both existing intents as well as new intents that are not included in the training database, but only supplied as inputs during the testing and application of the ZSIR model. Second, the ZSIR model not only outputs simple prediction, that is, which intents are matched, but also rich semantic information.

In particular, and referring to FIGS. 3 and 11, the ZSIR machine learning model is trained to predict several semantic outputs 40, including (1) the matching score 40 between the user query and each of the candidate intent labels and (2) two types of out-of-domain warnings 40B. These warnings 40B, in turn, include (a) a no-match warning, i.e., the user query is confidently not match with any of the candidate intent labels, and (b) an unseen warning: the user query is very strange and no confident decisions can be made.

Referring to FIG. 12, an internal flowchart 110 of the ZSIR model 36 in FIGS. 3 and 11 is shown. In particular, ZSIR model 36 includes context feature extractor 111 that receives input from dialog context 37, sentence feature extractor 112 that receives input from a user input sentence 39, and intent list feature extractor 113 that received input from intent label list 38. The feature extractors are not limited. For example, we can use a recurrent neural network to encode the context/intent/input to vector representations. Another example is that we can use hand-crafted features, including, without limitation, syntactic parses and part-of-speech tag, to represent these inputs. Following the extraction process on all data inputs, the extracted data is input to reasoning network 114, with the resulting data providing semantic output 40. FIG. 13 provides a more detailed description of the inputs and outputs shown in FIGS. 3, 11 and 12.

In this context, one key feature of the ZSIR model of the present invention is that the model can input a natural language sentence and output an intent label that represents the speaker's intention, including, without limitation, set_alarm_clock, ask_for_tv etc. This is called intent recognition and also is a known as a natural language understanding task or NLU. Further, zero-shot learning, by existing definition and application, is to train a model on data from a set of "train_labels," and then use this model to predict a set of "test_labels," where these "test_labels" are allowed to have novel labels that are not included in training. Because no "test_label" related data is used in training the model, this problem/training setting is known as zero-shot learning.

The system and method of the present invention also is novel in the manner by which zero-shot learning is achieved for intent recognition. First, zero-shot learning is important for intent classification because an intent label set is often changing in real-world dialog system development, and, therefore, it can be very difficult to settle down to a set of fixed intent labels. Because of this property, often the model will be asked to predict new labels that do not have any training data. A traditional model will go back to data collection in order to predict this new label (a tedious & expensive process), whereas a zero-shot model can continue to predict this new label directly. A zero-shot model can be further improved if there is data available for this new test label.

There are three primary key novel features of the ZSIR model of the present invention. First, ZSIR model uses natural language to represent intent. For example, instead of using one-hot encoding for a label, the ZSIR model of the present invention uses a sentence to represent the label. Second, the intent model takes a dynamic list of candidate intent labels and computes matching scores between each intent candidate with the user input. The items in this intent list can include both intents that result from intent flow graphs developed during the training stage and also new intents that are not generated in the training stage process. By comparison, traditional current models have to have a list of fixed intent labels, and all the intents in the list have to appear in the training data. Third, in addition to the matching score between user input & each intent label, the ZSIR model of the present invention also outputs out-of-domain warning, which includes to binary flags. These output warnings are of two types: (1) Type 1: The user input an outlier and no confident decisions can be made about it; and (2) Type 2: The model is confident that none of the intent labels match with this user input.

Figure 14:
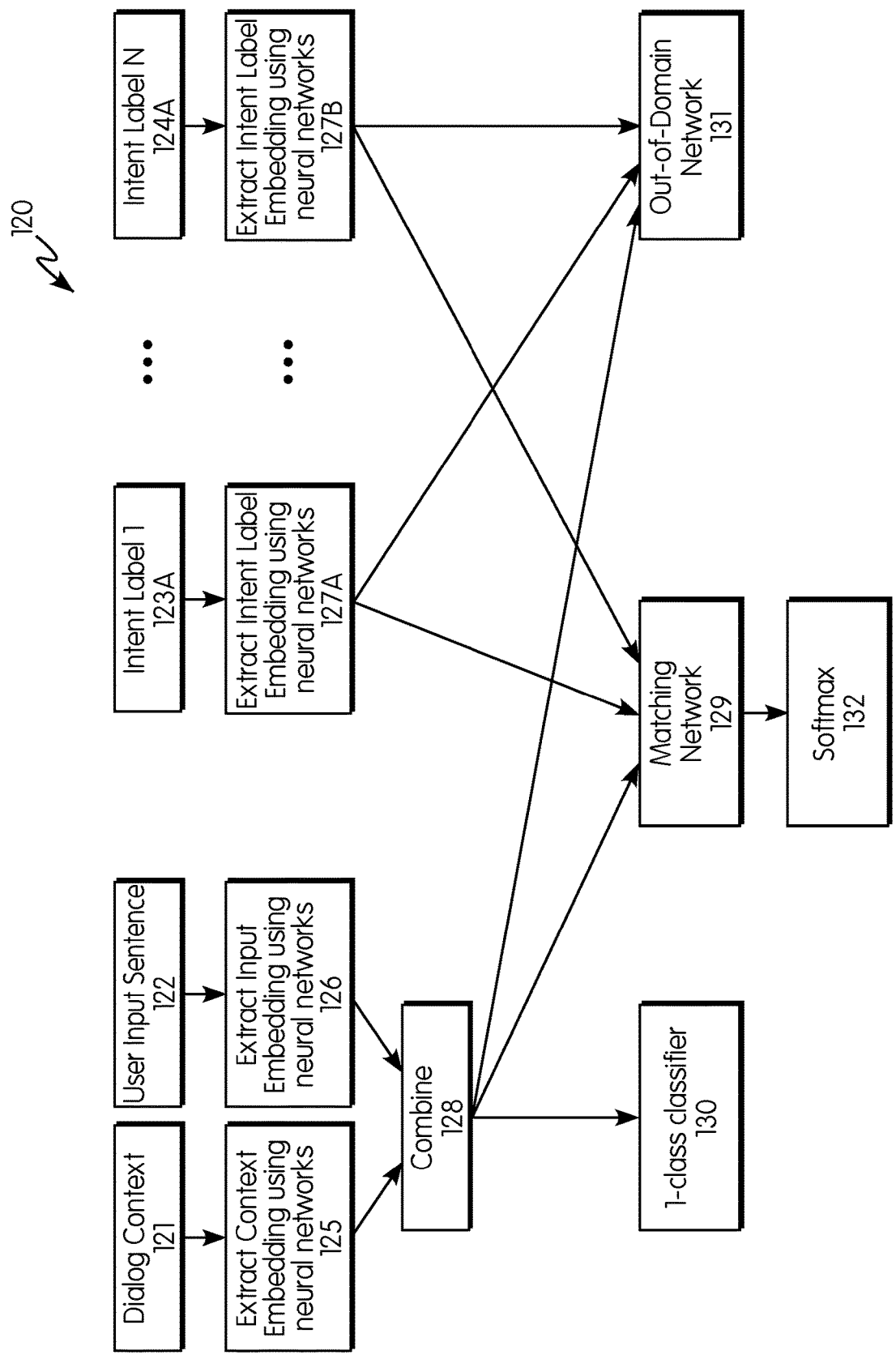
FIG. 14 is a block diagram showing the components of the ZSIR model according to one embodiment of the present invention.

FIG. 14 provides a more detailed block diagram 120 of the components of the ZSIR model. These components include inputs from dialog context 121, user input sentence 122, Intent-Label 1 123A, and Intent_Label 123B, together with corresponding extractors 125, 126, 127A and 127B that use neural networks. The extracted data from extractors 125 and 126 are combined in module 128 and that combined data is analyzed to determine whether it can proceed to matching neural network 129, or if a Type 1 Warning 130 or a Type 2 Warning 131 should be generated. The extracted data from extractors 127A and 127B either proceed to matching network 129 or generate a Type 2 Warning 131.

There are many possible neural network architectures that can be used to achieve the above goals in the setting of the present invention. In general, any available neural network, such as, without limitation, a recurrent neural network, convolutional neural network or any other sequence modeling network, can be used that enables the encoding of the list of intent labels into sentence embeddings 1. Next, any sequence modeling neural network can be used to encode the user input and dialog context into input embedding x. Then a matching score is computed via a reasoning network, which can be any type of neural network designed for classification to compute an energy function x and l: $E(x, l)$.

Using the above described system for the ZSIR model, an output score will be normalized via a Softmax layer 132 to output a probability distribution.

A model type 1 warning 130 is generated based upon the use of any 1-class classification techniques, including, without limitation, autoencoders 1-class classification (https://www.sciencedirect.com/science/article/pii/S092523120600261X), to detect if the user input and dialog context is observed in the training data and know to those with skill in the art. If input is determined to be an outlier, a Type 1 warning 130 will be generated. A Type 2 warning 131 is determined by training a separate reasoning network with any known binary classification models, including, without limitation, a feed-forward neural network and attention mechanism, to predict if the input falls into any of the intent labels based upon a given user input, a dialog context and a list of candidate intent labels.

Figure 15:
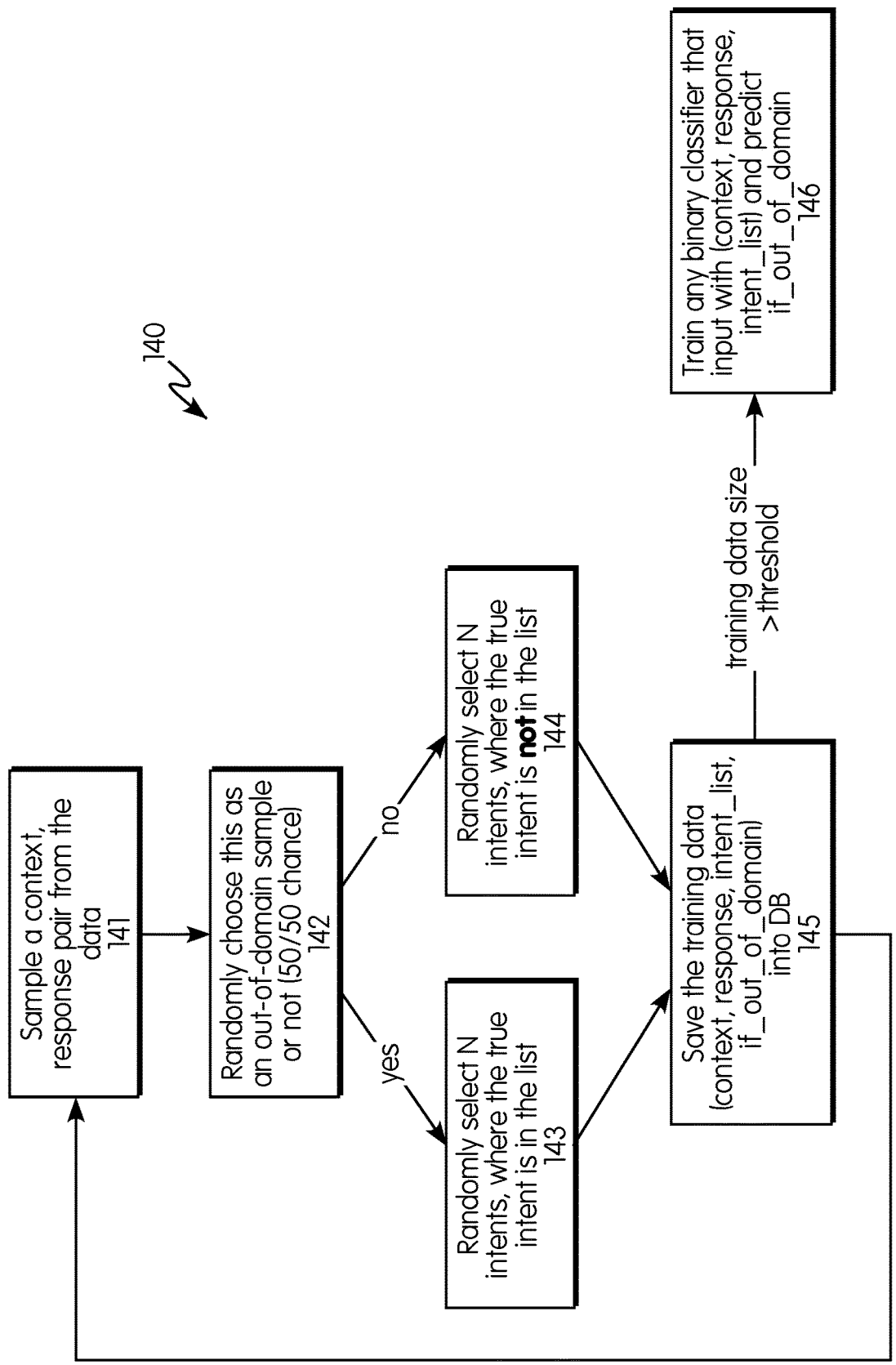
FIG. 15 is a flowchart showing the process steps of the meta-learning algorithm for training the out-of-domain network in the ZSIR model according to one embodiment of the present invention.

In one embodiment of the present invention, this meta-learning approach and algorithm is illustrated in the flowchart 140 shown in FIG. 15. This training algorithm is novel in this invention, and the ZSIR model can utilize any known optimization methods, including, without limitation, stochastic gradient descent, to optimize the ZSIR model for minimizing the cross-entropy loss for the matching score computation. As shown in FIG. 15, the first step 141 of the meta-learning process involves the sampling of a context and response pair from the data. At the second step 142, the selected sample is then randomly chosen as a sample that is or is not out of domain sample (a 50/50 chance of either choice exists). If yes, a random number N of intents is selected at step 143, where the true intent is in the list of selected intents N. If no, a random number N of intents is selected at step 144, where the true intent is not in the list of selected intents N. In the following step 145, the resulting training data is saved into a database. The saved data includes the context and response pair, the intent list, and "if_out _of_domain." Once the size of the training data in the database reaches a threshold 146, the data is made available at step 147 to train any binary classifier that is input with context, response and "intent list," to predict "if_out_of_domain." This training can be implemented via a neural network with a sigmoid or 2-class Softmax output or through the use of other non-probabilistic classifiers, such as, with limitation, Support Vector Machine (SVM)

In summary, this invention supports and provides a format that is easy to create by domain experts, while contains sufficient information to automatically generate a working dialog system. The main novelty of this invention focuses on the use of (1) intent flow, (2) a paraphrase task generator, and (3) a Zero-shot Intent Recognition or ZSIR Model. Intent flow helps domain experts to brainstorm about the expected user intents in a dialog domain. The paraphrase task generator provides a method to efficiently collect labelled natural language data for intent recognition, whereby there is no need for annotation since the ground-truth intent labels are known, and dialog context is taken into account.

Finally, the ZSIR model is used to parameterize the intent label (in natural language) into semantic embeddings and to output rich semantic information including matching score and out-of-domain warnings. One key advantage of parameterizing the intent labels into semantic embedding is that such parameterization enables zero-shot generalization. Further, since the intent labels are written in natural language, new incoming intent labels can still be understood by the models since the model learns to understand natural language.

This method and system of the present invention is robust and advantageous over existing current systems because the present invention frequently updates to the intent label list and, further, because less data is needed for training since the model now share knowledge across all different intent labels.

It will be understood that each of the elements and processes described above, or two or more together, may also find a useful application in other types of constructions differing from the types described above. While the invention has been illustrated and described in certain embodiments, it is not limited to the details shown, since it will be understood that various omissions, modifications, substitutions and changes in the forms and details of the system and method illustrated and its operation can be made by those skilled in the art without departing in any way from the spirit of the present invention.

What is claimed is:

1. A method of creating the natural language understanding component of a speech/text dialog system, the method comprising the steps of:
   a. defining a plurality of user intents in the form of an intent flow graph for each user intent, wherein the intent flow graph comprises at least one source node and at least one target node, with each at least one source node and at least one target node having a goal and an output and input function for multimodal natural interaction, and an edge with an intent label connecting the at least one source node to the at least one target node;
   b. creating, using an input processor, a (context, intent) pair from each of the plurality of intent flow graphs and storing a plurality of (context, intent) pairs in a training database;
   c. generating, using an output processor, a paraphrase task from each (context, intent) pair and storing a plurality of paraphrase tasks in the training database;
   d. training a zero-shot intent recognition model using the plurality of (context, intent) pairs in the training database to recognize user intents from the plurality of paraphrase tasks in the training database; and
   e. applying the zero-shot intent recognition model to a user query to generate a semantic output; and
   wherein if the at least one source node has two or more edges connecting to two or more target nodes, each at least one source node has an input value and each of the at least two or more edges is associated with an intent label describing a condition associated with each of the at least two or more edges, whereby a matching condition is determined between the input value of each at least one source node and the corresponding condition of the intent label in each of the at least two or more edges connecting to two or more target nodes.

2. The method of claim 1, wherein the input to each at least one source node can be any multimedia or data format.

3. The method of claim 2, wherein the input to each at least one source node is selected from the group consisting of text, audio, video and other structured data.

4. The method of claim 1, wherein the output from each at least one target node can be any multimedia or data format.

5. The method of claim 4, wherein the output from each at least one target node is selected from the group consisting of text, audio, video and other structured data.

6. The method of claim 1, wherein the step of generating a paraphrase task further comprises the steps of:
   a. randomly selecting a dialog context and intent pair from the database and creating an associated paraphrase task with an intent question and at least one corresponding sample answer;

b. answering the intent question by forming at least one new paraphrase answer in the form of a sentence that has a different form but the same meaning as the at least one corresponding sample answer; and
  c. assessing whether all dialog context and intent pairs have received an adequate number of new paraphrase answers.

7. The method of claim 1, wherein the zero-shot intent cognition model is trained using a machine learning tool.

8. The method of claim 1, wherein the user query to the zero-shot intent recognition model includes a user utterance, a dialog context for the user utterance and a plurality of natural language intent labels, wherein the intent labels can be new intent labels or derived from previously created intent flow graphs.

9. The method of claim 8, wherein the semantic output comprises (a) a matching score between the user utterance and each intent label in the plurality of intent labels, and (b) an out-of-domain warning.

10. The method of claim 9, wherein the out-of-domain warning is a no-match warning wherein the user query does match with any of the intent labels, and (b) an unseen warning wherein no confident decisions can be made as to the user query.

11. A system for creating the natural language understanding component of a speech/text dialog system, the system comprising:
  a. one or more computer processors;
  b. at least one intent flow graph for defining user intents, wherein the intent flow graph comprises at least one source node and at least one target node, with each at least one source node and at least one target node having a goal and an output and input function for multimodal natural interaction, and an edge with an intent label connecting the at least one source node to the at least one target node;
  c. a paraphrase task generator for creating, using an input processor, a (context, intent) pair from each of the plurality of intent flow graphs and storing a plurality of (context, intent) pairs in a training database and generating, using an output processor, a paraphrase task from each (context, intent) pair and storing a plurality of paraphrase tasks in the training database;
  d. a zero-shot intent recognition model trained by using the plurality of (context, intent) pairs in the training database to recognize user intents from the plurality of paraphrase tasks in the training database; and
  wherein the at least one source node has two or more edges connecting to two or more target nodes, each at least one source node has an input value and each of the at least two or more edges is associated with an intent label describing a condition associated with each of the at least two or more edges, whereby a matching condition is determined between the input value of each at least one source node and the corresponding condition of the intent label in each of the at least two or more edges connecting to two or more target nodes.

12. The system of claim 11, wherein the input to each at least one source node can be any multimedia or data format.

13. The system of claim 12, wherein the input to each at least one source node is selected from the group consisting of text, audio, video and other structured data.

14. The system of claim 11, wherein the output from each at least one target node can be any multimedia or data format.

15. The system of claim 14, wherein the output from each at least one target node is selected from the group consisting of text, audio, video and other structured data.

16. The system of claim 11, wherein the paraphrase task generator comprises:
  a. randomly selecting a dialog context and intent pair from the database and creating an associated paraphrase task with an intent question and at least one corresponding sample answer;
  b. answering the intent question by forming at least one new paraphrase answer in the form of a sentence that has a different form but the same meaning as the at least one corresponding sample answer; and
  c. assessing whether all dialog context and intent pairs have received an adequate number of new paraphrase answers.

17. The system of claim 11, wherein the zero-shot intentecognition model is trained using a machine learning tool.

18. The method of claim 11, wherein the user query to the zero-shot intent recognition model includes a user utterance, a dialog context for the user utterance and a plurality of natural language intent labels, wherein the intent labels can be new intent labels or derived from previously created intent flow graphs.

19. The method of claim 18, wherein the semantic output comprises (a) a matching score between the user utterance and each intent label in the plurality of intent labels, and (b) an out-of-domain warning.

20. The system of claim 19, wherein the semantic output includes a matching score between the user query and each of the two or more intent labels and an out-of-domain warning.

21. The system of claim 20, wherein the out-of-domain warning is a no-match warning wherein the user query does match with any of the intent labels, and (b) an unseen warning wherein no confident decisions can be made as to the user query.

* * * * *